Nov. 13, 1956  S. KRASNOW  2,770,736
RADIOACTIVE METHOD FOR MARKING BOREHOLE FORMATIONS
Original Filed April 10, 1942
Fig. 1.
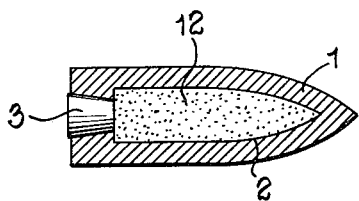
Fig. 2.
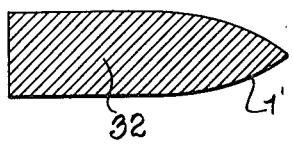
Fig. 3.
Fig. 4.
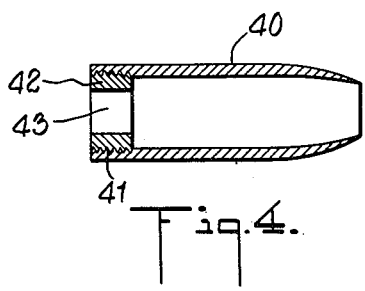
Fig. 5.
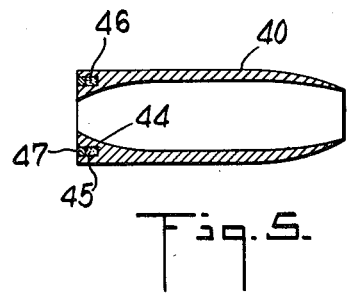
Fig. 6.
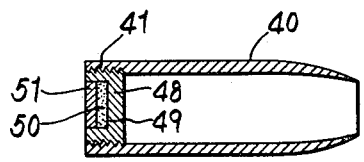
INVENTOR.
SHELLEY KRASNOW
BY
Campbell, Brumbaugh, Free & Graver
ATTORNEYS

United States Patent Office 2,770,736
Patented Nov. 13, 1956

2,770,736
RADIOACTIVE METHOD FOR MARKING BOREHOLE FORMATIONS

Shelley Krasnow, Fairfax County, Va., assignor to Schlumberger Well Surveying Corporation, Houston, Tex., a corporation of Delaware Original application April 10, 1942, Serial No. 438,475, now Patent No. 2,592,434, dated April 8, 1952. Divided and this application March 12, 1952, Serial No. 276,194

10 Claims. (Cl. 250—83.6)

This is a division of my copending application Serial No. 438,475, filed April 10, 1942, for "Radioactive Markers," now U. S. Letters Patent No. 2,592,434.

This invention relates to radioactive markers and particularly to projectiles such as bullets exhibiting radioactive properties, to compositions useful in making or for incorporation into such projectiles, and to methods of utilizing the projectiles and compositions for purposes of marking substances, articles, objects, localities and geological formations for subsequent location, detection, or identification.

The invention will be particularly illustrated by referring to borehole operations without any limitation since it is useful in many directions of which borehole use is exemplary. Such illustration by borehole use is particularly valuable since unique results are secured thereby.

Various objects and advantages of the invention may be referred to in this connection.

In connection with operations carried out in boreholes, it is often desirable to mark formations at a given depth within the borehole so that they may afterward be recognized and located with certainty. This is particularly desirable in view of the fact that such formations may be many thousands of feet underground and any cable or other means utilized to lower an apparatus to that point will necessarily have a variable stretch, and will introduce errors by its use.

It is desirable to have a marker which may easily be identified and located, and preferably one which can be located through thicknesses of water, mud, oil, rock and steel casing. One of the most important uses of such a marker will be in cases where it is desired to mark a formation which has been definitely located by borehole logging or geological means, and which is therefore, of a certain and definite nature.

After casing has been driven it is desirable to locate this again so that by its relation to the important strata, other operations may afterwards be conducted.

Other objects and advantages will appear from the more detailed description set forth below, it being understood, however, that this more detailed description is given by way of illustration and explanation only and not by way of limitation since various changes therein may be made by those skilled in the art without departing from the scope and spirit of the present invention.

In connection with that more detailed description, reference may be had to the accompanying drawings in which:

Figure 1 is a view in longitudinal section of a bullet formed in accordance with the present invention;

Figure 2 is a view in longitudinal section of another form of bullet;

Figure 3 shows a radioactive pellet;

Figure 4 is a view in longitudinal section of an earth core sampling bullet provided with a radioactive insert;

Figure 5 is a view in longitudinal section of a core sampling bullet comprising a modification of the form shown in Figure 4; and Figure 6 is a view in longitudinal section of a core sampling bullet comprising another modification of the form shown in Figure 4.

The present invention is particularly concerned with the use of projectiles or markers to be positioned in an article, object, stratum, etc., to mark, identify, or locate such article, object, stratum, etc., with an ineradicable mark which is generally unrecognizable except by instruments constructed for use in connection therewith. The projectiles or markers used are desirably those which exhibit ray emission properties, such as radioactivity, and thus lend them properties readily identified by properly sensitive means. A number of illustrations are set forth below.

Referring to Figure 1, a bullet 1 is shown provided with a cavity 2 in which is disposed a radioactive material 12 retained by a plug 3. In Figure 2 a bullet 1' is shown which may be made of a radioactive metal or alloy 32. Thus the metal may itself be radioactive or radioactive material may be dispersed in the metal. The radioactive element is desirably one which either itself gives off rays, or induces rays, such as gamma rays, in other substances.

The radioactive material mentioned above may be a substance which may be artificially activated. Thus oil, sand with oil, which has in turn been subjected to radon gas will be radioactive and serve, or materials artificially activated by nuclear bombardment may be utilized. Thus, a considerable number of the ordinarily non-radioactive elements may be utilized, the particular ones selected being dependent upon the length of time it is desired to have the bullet identifiable by radioactive means. Thus, yttrium will maintain an artificially excited radioactivity for several months, while other substances will maintain such radioactivity for a relatively short time. Sulphur is an example of such a substance. The material 12 of Figure 1 may be of material such as yttrium or sulphur, or the bodies of the projectiles themselves may be of material which will respond readily to artificial activating processes. In appropriate cases, the bullet will be fired, an instrument sent down to activate the bullet, and subsequent radioactive measurements made to determine the exact locality in the manner disclosed in my Patent No. 2,592,434, in which reference is made to the application of Krasnow and Curtiss, Serial No. 137,380, filed April 16, 1937, now abandoned, of which Patent No. 2,384,840 is a division. Several different types of material may be utilized for the bullets or the fillings therein in a single borehole, each one marking a separate type of condition. They can then be artificially activated and subsequent measurements will show the different properties of each. The artificial activation mentioned may be caused by bombardment with neutrons and a convenient way of effecting this is to have a substance such as beryllium which gives off neutrons readily on bombardment by radioactive rays intermixed with the material in the bullet. By lowering a radioactive source proximate to the bullet, the rays will excite neutrons in the beryllium, which neutrons will impinge upon the material within the bullet, causing artificial temporary radioactivity therein.

Figure 3 shows a pellet 8 made in cylindrical form. This may be formed with any of the binders mentioned in the said copending application, Serial No. 438,475, or may have some simple binder such as starch or gum arabic. The pellet may be molded in the type of apparatus commonly used by pharmacists for molding pills or tablets. In cases where it is desired to mark with radioactive material, and not to use a metallic projectile, a pellet such as shown in Figure 3 may be utilized, made up of explosive material with radioactive substances intermixed. This may be exploded within the borehole and will spatter the walls of the borehole with radioactive material. This procedure will be useful, for example, where continued erosion or breaking away is suspected. Successive radioactive measurements will indicate whether the material is being eroded, since in such cases the radioactivity will continually diminish more rapidly than would be the case in the absence of erosion.

Figures 4–6 illustrate the adaptation of earth core type bullets to the present invention in which such bullets as ordinarily employed in sampling guns, are given radioactive properties. For example, as shown in Figure 4, the usual type of such bullet illustrated at 40 may have one end thereof internally threaded at 41, and a radioactive collar 42 externally threaded, may be positioned in the bullet 40. Such radioactive collar 42 may be radioactive in any way utilizing any of the expedients set forth above. By the use of a collar 42, having the opening 43, the bullet offers less resistance to penetration.

Or, the walls of the bullet may be of greater thickness as shown at 44 in Figure 5, so that a recess 45 may be made therein into which radioactive material 46 may be inserted, and such recess then sealed by a seal 47. Any radioactive material may be used as explained above.

Or, as shown in Figure 6, the ordinary bullet 40, may have one end threaded internally, as at 41, into which a plug 48 is threaded. Such plug may be provided with a recess 49 into which radioactive material 50 either in loose or pellet form may be placed, and a seal 51 then positioned to hold the radioactive material in place.

It is apparent from what has been set forth above, that the projectile or bullet may take any desired form and may be given radioactive properties in a variety of ways.

In the foregoing, specific mention has been made of a projectile which is driven into the walls of the bore-hole by explosion or other driving force. After being driven into the walls of the borehole, the projectile and its contents remain intact. However, it will be understood that the bullet may be constructed so that it will shatter upon coming in contact with a formation, and will spread its contents. Thus, the bullet may have within it an explosive charge mixed with radioactive material, which will explode when the bullet comes in contact with the wall of the borehole, and will scatter the radioactive material in the vicinity. In firing, the bullet may be omitted entirely and a charge of explosive and radioactive material fired against the wall of the borehole. This will spatter the wall of the borehole with the radioactive material, without actually having a single solid projectile embed itself.

The methods described, while most useful for operations in a borehole, may also serve to mark localities under other conditions. Thus, monuments or bench marks are often placed to locate boundary marks and property lines. Such monuments often become covered over with vegetation and sometimes with wind-blown or drifted earth. Furthermore, for instance a piece of lumber may be marked with an invisible identifying mark. This piece of lumber may then be identified in the future, the identifying mark being invisible and not detectable to persons not utilizing radioactive measuring means.

I claim:

1. In a method of identifying a particular mass of material disposed among other masses, the steps of incorporating in the particular mass a localized concentration of a normally non-radioactive substance capable of being readily artificially radioactivated, subsequently exposing the masses to a source of radiation to activate the said substance and detecting radiations other than from the source and attributable to said activation of the substance to locate the particular mass.

2. In a method of identifying a particular mass of material disposed among other masses, the steps of incorporating in the particular mass a localized concentration of a substance capable of readily emitting neutrons when irradiated, subsequently irradiating the total masses to excite neutrons in the said substance and detecting radiations indicative of the presence of the neutron emitting substance.

3. In a method of identifying a particular mass of material, the steps of disposing in the particular mass a localized concentration of a substance capable of readily emitting neutrons when irradiated, subsequently irradiating the total mass with a controlled source of radiations to induce neutron emission from the said substance and detecting gamma radiations from the irradiated mass as indicative of the neutron emission.

4. In a method of identifying a particular mass of material disposed among the masses of material the steps of incorporating a localized concentration of beryllium in the particular mass, subsequently irradiating the masses to induce a neutron emission from the beryllium and detecting radiations attributable to said neutron emission as indicative of the presence of the particular mass.

5. In a method of identifying a particular mass of material disposed among other masses of material, the steps of incorporating in the particular mass a localized concentration of beryllium and a second substance capable of emitting gamma radiations when bombarded with neutrons, subsequently irradiating the masses to induce a neutron emanation from the beryllium, and detecting the presence of gamma radiations as indicative of the presence of said particular mass.

6. In a method of operation in a borehole, the steps of disposing in a formation traversed by the borehole a localized concentration of a material which is capable of readily emitting neutrons when exposed to an irradiating source, subsequently passing an irradiating source through the borehole to induce neutron emission from the material and detecting radiations throughout the borehole other than from said source to locate the formation.

7. In a method of marking a borehole, the steps of lodging in a formation traversed by the borehole a marker including beryllium and a second substance capable of emitting gamma radiations when subjected to bombardment by neutrons, passing a source of radiations through the borehole to induce neutron emission from the beryllium, and detecting the gamma radiations other than from the said source as indicative of the presence of the marker.

8. In a method of marking formations within a borehole for subsequent identification, the steps of introducing respectively into at least two localities correlated with different physical conditions and traversed by the borehole, localized concentrations of normally non-radioactive materials capable of being readily artificially radioactivated to produce detectably different radiations when substantially equally irradiated, passing an irradiating source through the borehole to induce artificial radiations from the materials, and performing radioactive measurements within the borehole to obtain responses from the respective radiations given off by the artificially radioactive materials to identify the respective localities.

9. In a method of determining the amount of erosion of the wall of a borehole, the steps of spattering a radioactive material on the walls of a portion of the borehole and measuring the radioactivity of the said portion of the borehole at a plurality of different times after the spattering to obtain data indicative of the amount of erosion of the borehole wall.

10. In a method of determining the amount of erosion of the wall of a borehole, the steps of exploding in the borehole an explosive material associated with radioactive material to spatter the radioactive material on the walls of the borehole, and measuring the radioactivity present in the borehole in the vicinity of the explosion at a plurality of different times to obtain data indicative of the erosion of the borehole wall.

References Cited in the file of this patent

UNITED STATES PATENTS

| Number | Name | Date |
| --- | --- | --- |
| Re. 23,226 | Bender | May 9, 1950 |
| 726,291 | Holmblad | Apr. 28, 1903 |
| 894,707 | Schultz et al. | July 28, 1908 |
| 1,054,777 | Imperiali | Mar. 4, 1913 |
| 1,275,669 | Forbes | Aug. 13, 1918 |
| 2,228,623 | Ennis | Jan. 14, 1941 |
| 2,302,247 | Neufeld | Nov. 17, 1942 |
| 2,320,643 | Neufeld | June 1, 1943 |
| 2,474,581 | Howell | June 28, 1949 |